US010963500B2

United States Patent
Vernier et al.

(10) Patent No.: US 10,963,500 B2
(45) Date of Patent: Mar. 30, 2021

(54) DETERMINING ANSWERS TO COMPARATIVE QUESTIONS

(71) Applicant: INTERNATIONAL BUSINESS MACHINES CORPORATION, Armonk, NY (US)

(72) Inventors: Stanley J. Vernier, Grove City, OH (US); Stephen A. Boxwell, Columbus, OH (US); Kyle M. Brake, Dublin, OH (US); Keith G. Frost, Delaware, OH (US)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 16/121,390

(22) Filed: Sep. 4, 2018

(65) Prior Publication Data

US 2020/0074000 A1   Mar. 5, 2020

(51) Int. Cl.
  *G06F 16/33*   (2019.01)
  *G06F 16/93*   (2019.01)
  *G06F 16/332*  (2019.01)

(52) U.S. Cl.
  CPC ...... *G06F 16/3344* (2019.01); *G06F 16/3329* (2019.01); *G06F 16/93* (2019.01)

(58) Field of Classification Search
  CPC .... G06F 16/3329; G06F 16/3344; G06N 5/04
  See application file for complete search history.

(56) References Cited

U.S. PATENT DOCUMENTS

| 6,675,159 | B1  | 1/2004  | Lin et al. |
| 8,209,175 | B2* | 6/2012  | Mukerjee ............... G06Q 30/02 704/242 |
| 8,280,838 | B2  | 10/2012 | Ferrucci et al. |
| 8,484,201 | B2* | 7/2013  | Li ...................... G06F 16/3329 707/723 |

(Continued)

OTHER PUBLICATIONS

Kanayama et al, Answering Yes/No Questions via Question Inversion, Proceedings of COLING 2012: Technical Papers, pp. 1377-1392, COLING 2012, Mumbai, Dec. 2012. (Year: 2012).*

(Continued)

*Primary Examiner* — Marc S Somers
(74) *Attorney, Agent, or Firm* — Conley Rose, P.C.

(57) ABSTRACT

A computer-implemented method includes receiving an input query including a comparative question referencing a plurality of entities. The comparative question includes a comparative term regarding a metric associated with the plurality of entities. The computer-implemented method includes generating a plurality of polar questions. Each of the plurality of polar questions seeks a polar answer to a comparison, along the metric and according to the comparative term, between a target entity of the plurality of entities and at least one second entity of the plurality of entities. The computer-implemented method includes determining confidence scores for the plurality of polar questions. The computer-implemented method includes identifying a particular polar question of the plurality of polar questions based on the confidence scores. The computer-implemented method includes outputting a response to the input query that identifies the target entity of the particular polar question as an answer to the input query.

12 Claims, 5 Drawing Sheets

(56) References Cited

U.S. PATENT DOCUMENTS

| | | | |
|---|---|---|---|
| 9,336,269 | B1 | 5/2016 | Smith et al. |
| 9,507,854 | B2 | 11/2016 | Brown et al. |
| 9,690,774 | B1 | 6/2017 | Beason et al. |
| 9,720,962 | B2 | 8/2017 | Allen et al. |
| 2007/0196804 | A1 | 8/2007 | Yoshimura et al. |
| 2010/0235311 | A1 | 9/2010 | Cao et al. |
| 2013/0018875 | A1 | 1/2013 | Qiao |
| 2013/0262501 | A1 | 10/2013 | Kuchmann-Beauger et al. |
| 2016/0124961 | A1 | 5/2016 | Bishop et al. |
| 2016/0170989 | A1 | 6/2016 | Bishop et al. |
| 2016/0179922 | A1 | 6/2016 | Crupi et al. |
| 2016/0350406 | A1* | 12/2016 | Byron ............... G06F 16/3329 |
| 2017/0017716 | A1* | 1/2017 | Joshi .................... G06F 16/93 |

OTHER PUBLICATIONS

Yang, et al., "Learning to Answer Biomedical Factoid & List Questions: OAQA at BioASQ 3B," 2016, 16 pages.

Choi, et al., "Processing Comparisons and Evaluations in Business Intelligence: A Question Answering System," 2011 International Conference on Uncertainty Reasoning and Knowledge Engineering, 2011, vol. 1, pp. 137-140.

Cui, et al., "KBQA: Learning Question Answering over QA Corpora and Knowledge Bases," Proceedings of the VLDB Endowment, vol. 10, No. 5, 2017, pp. 565-576.

Blair-Goldensohn, "Long-Answer Question Answering and Rhetorical-Semantic Relations," 2007, Thesis, 272 pages.

Leonhard, "Automated Question Answering for Clinical Comparison Questions," Thesis, Doctor of Philosophy, Institute for Language, Cognition and Computation School of Informatics, University of Edinburgh, 2012, 12 pages.

Nicholson, et al., "Answering comparison questions in SHAKEN: A progress report," AAA1 Spring Symposium on Mining Answers from Text and Knowledge Bases, Stanford, CA, 2002.5 pages.

Scheible, "Answering Comparison Questions: What's the Difference?," Thesis, Speech and Language Processing Theoretical and Applied Linguistics, School of Philosophy, Psychology and Language Sciences, University of Edinburgh, 2005, 89 pages.

Jennifer Chu-Carroll, et al. "In question answenng, two heads are better than one," In Proceedings of the 2003 Conference of the North American Chapter of the Association for Computational Linguistics on Human Language Technology—vol. 1, pp. 24-31. Association for Computational Linguistics, 2003. Retrieved from Internet using: https://www.researchgate.net/profile/John_Prager/publication/2891826_In_Question_Answering_Two_Heads_Are_Better_Than_One/links/00b7d52a9d73c60922000000/In-Question-Answering-Two-Heads-Are-Better-Than-One.pdf.

* cited by examiner

DETERMINING ANSWERS TO COMPARATIVE QUESTIONS

BACKGROUND

Question/Answering (Q/A) systems automatically answer questions posed in a natural language. Q/A systems may have difficulty answering comparative statements or questions because an explicit comparison between entities referenced in the comparative statement or question is not mentioned in a corpus, the answer is not likely in any list of the top N answers for that category, or the comparative statement or question does not fit the expected factoid question structure of candidate answers replacing the focus word in the comparative statement or question.

SUMMARY

According to an aspect of the present disclosure, a computer-implemented method includes receiving an input query including a comparative question referencing a plurality of entities. The comparative question includes a comparative term regarding a metric associated with the plurality of entities. The computer-implemented method includes generating a plurality of polar questions. Each of the plurality of polar questions seeks a polar answer to a comparison, along the metric and according to the comparative term, between a target entity of the plurality of entities and at least one second entity of the plurality of entities. The computer-implemented method includes determining confidence scores for the plurality of polar questions. The computer-implemented method includes identifying a particular polar question of the plurality of polar questions based on the confidence scores. The computer-implemented method includes outputting a response to the input query that identifies the target entity of the particular polar question as an answer to the input query.

According to an aspect of the disclosure, a computer-implemented method includes receiving an input query including a comparative question referencing a plurality of entities. The comparative question includes a comparative term regarding a metric associated with the plurality of entities. The computer-implemented method includes determining factoid questions for the plurality of entities. Each of the factoid questions references a respective entity of the plurality of entities and seeks a factual answer regarding the metric and the respective entity of the plurality of entities. The computer-implemented method includes determining search queries based on the factoid questions. The computer-implemented method includes retrieving one or more documents or passages from a corpus of unstructured documents based on the search queries. The computer-implemented method includes determining answers to the factoid questions using the retrieved one or more documents or passages. The answers correspond to the metric. The computer-implemented method includes determining a particular answer that satisfies a criteria that is based on the comparative term. The computer-implemented method includes determining a particular entity of the plurality of entities that corresponds to the particular answer as an answer to the input query. The computer-implemented method includes outputting a response that identifies the particular entity as the answer to the input query.

According to an aspect of the disclosure, a computer program product for determining an answer to a comparative question includes a computer readable storage medium having program instructions embodied therewith. The program instructions are executable by a processor to cause the processor to receive an input query including a comparative question referencing a plurality of entities. The comparative question includes a comparative term regarding a metric associated with the plurality of entities. The program instructions are executable by the processor to cause the processor to generate a plurality of polar questions. Each of the plurality of polar questions seeks a polar answer to a comparison, along the metric and according to the comparative term, between a target entity of the plurality of entities and at least one second entity of the plurality of entities. The program instructions are executable by the processor to determine confidence scores for the plurality of polar questions. The program instructions are executable by the processor to identify a particular polar question of the plurality of polar questions based on the confidence scores. The program instructions are executable by the processor to output a response that identifies the target entity of the particular polar question as an answer to the input query.

DETAILED DESCRIPTION

Figure 1:
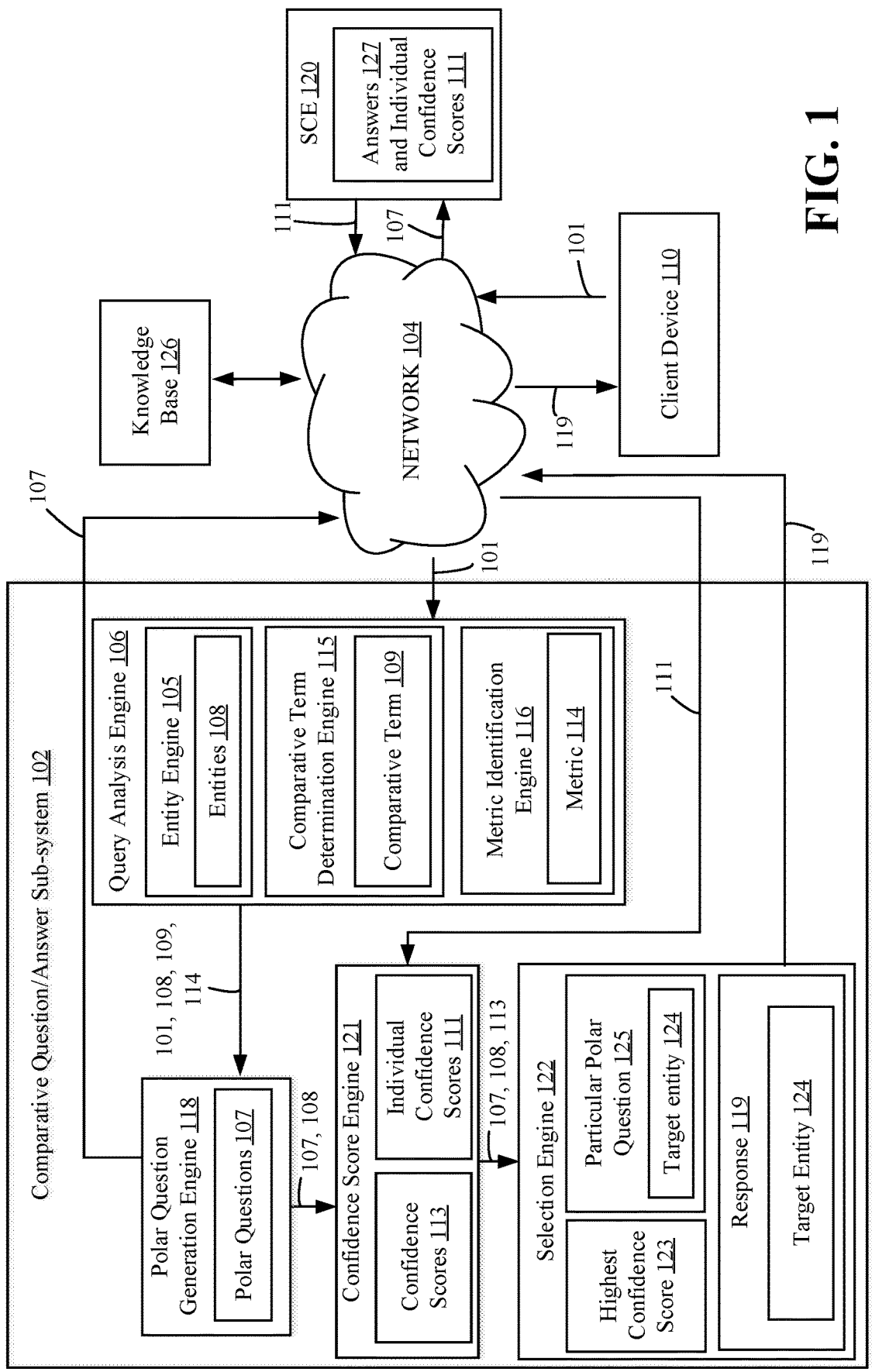
FIG. 1 is a block diagram view of an embodiment of a system according to the present disclosure.

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity, and the singular forms "a", "an" and "the" are intended to include the plural forms as well, unless the context clearly indicates otherwise.

An engine as referenced herein may comprise of software components such as, but not limited to, computer-executable instructions, data access objects, service components, user interface components, application programming interface (API) components; hardware components such as electrical circuitry, processors, and memory; and/or a combination thereof. The memory may be volatile memory or non-volatile memory that stores data and computer executable instructions. The computer-executable instructions may be in any form including, but not limited to, machine code, assembly code, and high-level programming code written in any programming language. The engine may be configured to use the data to execute one or more instructions to perform one or more tasks.

Embodiments of the disclosure include systems that analyze a comparative question referencing multiple entities and determine an entity of the multiple entities as an answer to the comparative question.

In some examples, a system determines the entity using a yes/no pipeline. In these examples, the system determines a polar question for each of the entities referenced in the comparative question based on the comparative question. A polar question is a yes/no question, a question presenting an exclusive disjunction, and/or a question with a pair of alternatives of which only one is acceptable as an answer. A polar answer is an answer to a polar question. For example, when the polar question is a yes/no question, a polar answer is a yes/no answer. The system then determines confidence scores for each of the polar questions, identifies a particular polar question of the multiple polar questions based on the confidence scores, and determines a target entity of the particular polar question as the answer to the particular polar question.

In other examples, the system determines the entity using a factoid pipeline. In these examples, the system determines a factoid question for each of the entities referenced in the comparison question based on the comparative question. A factoid question is an open question, typically requiring a statement as an answer; a wh-question (e.g., who, what, when, where, or why); and/or a how question. The factoid pipeline determines answers to the factoid questions. The system then evaluates the answers against a criteria to determine an entity as an answer to the input question.

FIG. 1 illustrates an example of a system 100 (e.g., a Q/A system) configured to determine, using a yes/no pipeline, an entity as an answer to an input query 101 that includes a comparative question. The system 100 includes a client device 110, a comparative question/answer sub-system 102, a sentence correctness evaluator (SCE) 120 (which may also be referred to as a yes/no pipeline), and a knowledge base 126. The comparative question/answer sub-system 102 includes or is communicatively coupled to the SCE 120 and/or the knowledge base 126 via the network 104. The knowledge base 126 contains a collection or corpus of data, documents, or other works, which may include structured and unstructured data.

The client device 110 provides the input query 101 to the comparative question/answer sub-system 102. In the example illustrated in FIG. 1, the client device 110 provides the input query 101 to the comparative question/answer sub-system 102 via the network 104. However, the client device 110 may provide the input query 101 to the comparative question/answer sub-system 102 using a different communication means. The input query 101 may be an input statement that references the plurality of entities 108 or a polar question that references the plurality of entities 108. The input query 101 includes a comparative term 109 regarding a metric 114 associated with the plurality of entities 108. The comparative term 109 may correspond to a superlative or comparative adjective. To illustrate, the input query 101 may correspond to the question "Who is older, Donald Trump, George H. W. Bush, or Barack Obama?". In this example, the plurality of entities 108 correspond to Donald Trump, George H. W. Bush, and Barack Obama, the metric 114 corresponds to age, and the comparative term 109 is "older" (i.e., of greater age).

The comparative question/answer sub-system 102 includes a query analysis engine 106 configured to receive the input query 101. The query analysis engine 106 includes an entity engine 105 configured to process the input query 101 to determine the plurality of entities 108, a comparative term determination engine 115 configured to determine the comparative term 109, and a metric identification engine 116 configured to determine the metric 114. The entities 108, the comparative term 109, and the metric 114 may be determined using natural language processing (NLP). In some examples, the query analysis engine 106 is configured to determine the plurality of entities 108 using dictionary lookups against outside databases (e.g., DBPedia or Freebase), using a heuristic technique based on capitalization patterns, or using the output of a syntactic parser, such as a slot grammar (SG) parser (which will group first and last names into a single token, based on the overall syntax of the phrase). Additionally or alternatively, the query analysis engine 106 may be configured to determine the comparative term 109 and the metric 114 using dictionary lookups. However, in other examples, different techniques are used to identify the plurality of entities 108, the comparative term 109, and the metric 114.

The comparative question/answer sub-system 102 includes a polar question generation engine 118 configured to generate a plurality of polar questions 107. Each of the plurality of polar questions 107 seeks a polar answer to a comparison, along the metric 114 and according to the comparative term 109, between a target entity of the plurality of entities 108 and at least one second entity of the plurality of entities 108. Each of the plurality of polar questions 107 includes a different target entity of the plurality of entities 108, and is generated using any known technique to generate a question that seeks a polar answer to a comparison, along the metric 114 and according to the comparative term 109, between a respective target entity and at least one second entity of the plurality of entities 108. For example, the polar question generation engine 118 may be configured to generate a polar question 107 according to a particular question structure. As an example, the particular question structure may correspond to the following components in the following order: 1) a target entity of the plurality of entities 108; 2) the metric 114 and/or the comparative term 109; and 3) the remaining entities of the plurality of entities 108. To illustrate using the above example input query 101 of "Who is older, Donald Trump, George H. W. Bush, or Barack Obama?" (where the metric 114 corresponds to age and the comparative term 109 corresponds to "older"), the polar question generation engine 118 may generate a first polar question "Is Donald Trump older than George H. W. Bush and Barack Obama?", a second polar question "Is George H. W. Bush older than Donald Trump and Barack Obama?", and a third polar question "Is Barack Obama older than Donald Trump and George H. W. Bush?". In the first polar question, Donald Trump corresponds to the target entity and the at least one second entity corresponds to George H. W. Bush and Barack Obama. In the second polar question, George H. W. Bush corresponds to the target entity and the at least one second entity corresponds to Donald Trump and Barack Obama. In the third polar question, Barack Obama corresponds to the target entity and the at least one second entity corresponds to Donald Trump and George H. W. Bush.

The polar questions 107 are provided to the SCE 120, which is configured to return individual confidence scores 111 for the polar questions 107. The SCE 120 receives the polar questions 107 and determines answers 127 (e.g., polar answers) and the individual confidence scores 111 for the polar questions 107. Each of the individual confidence scores 111 indicates a confidence that an answer 127 to a respective polar question 107 is positive (e.g., "Yes"). The SCE 120 may use any known technique for determining the answers 127 and the individual confidence scores 111.

In some examples, the SCE 120 determines the individual confidence scores 111 for each of the polar questions 107 based on an answer 127 and associated confidence estimate for the polar question 107. For polar questions 107 for which the SCE 120 determines a positive (e.g., "Yes") answer, the SCE 120 may use the confidence estimate determined for the polar question 107 as the individual confidence score for the polar question 107. For polar questions 107 for which the SCE 120 determines a negative (e.g., "No") answer, the SCE 120 may use a value corresponding to one minus the confidence estimate determined for the polar question 107 as the individual confidence score for the polar question 107.

The confidence estimate for a polar question 107 indicates a confidence that the determined answer 127 for the polar question 107 is correct. In some examples, the SCE 120 determines the answers 127 and confidence estimates by determining search queries based on the plurality of polar questions 107 (e.g., based on features of the plurality of polar questions 107), applying the queries to the knowledge base 126 to retrieve one or more documents or passages from a corpus of unstructured documents in the knowledge base 126 (that have some potential for containing a valuable response) based on the search queries, and determining the answers 127 and associated confidence estimates for the polar questions 107 using the retrieved one or more documents or passages. The SCE 120 may be configured to determine the answers 127 and associated confidence estimates by performing deep analysis on the language in the polar questions 107 and the language used in each of the portions of the corpus of data found during application of the search queries using one or more reasoning algorithms. However, in other examples, the SCE 120 uses one or more different techniques to determine the answers 127 and confidence estimates.

Using the above example first, second, and third polar questions to illustrate, the SCE 120 may determine and provide an individual confidence score of 0.05 for the first polar question "Is Donald Trump older than George H. W. Bush and Barack Obama?", an individual confidence score of 0.9 for the second polar question "Is George H. W. Bush older than Donald Trump and Barack Obama?", and an individual confidence score of 0.05 for the third polar question "Is Barack Obama older than Donald Trump and George H. W. Bush?".

The comparative question/answer sub-system 102 includes a confidence score engine 121 configured to determine confidence scores 113 for the plurality of polar questions 107. In some examples, the confidence score engine 121 is configured to determine the confidence scores 113 by determining a composite confidence score for each of the plurality of polar questions 107 based on the individual confidence scores 111.

In some examples, the confidence score engine 121 is configured to determine the composite confidence scores for the plurality of polar questions 107 by determining a difference value for each of the individual confidence scores 111, determine a sum of the individual confidence score of the polar question and the difference values for the other questions of the plurality of polar questions 107, and divide the sum of the individual confidence score of the polar question and the difference values for the other questions by a number of the plurality of polar questions 107. In some examples, the difference value for each of the plurality of polar questions 107 corresponds to one minus the individual confidence score for the question. To illustrate, the confidence score engine 121 may be configured to determine a composite confidence score CS for a polar question P according to Equation 1, where $IS_P$ represents an individual confidence score for the polar question to which the composite confidence score being determined corresponds, $IS_{OTHER}^n$ represents an $n^{th}$ individual confidence score for polar questions other than the polar question to which the composite confidence score being determined corresponds, and x is equal to a number of the plurality of polar questions 107 minus 1 (i.e., a number of the polar questions other than the polar question to which the composite confidence score being determined corresponds).

$$CS(P) = \frac{IS_P + \sum_{n=1}^{x} 1 - IS_{OTHER}^n}{x+1} \qquad \text{Equation 1}$$

To illustrate using the above example first, second, and third polar questions and associated individual confidence scores, a composite confidence score CS(1) for the first example polar question P=1 may be determined according to Equation 2, a composite confidence score CS(2) for the second example polar question P=2 may be determined according to Equation 3, and a composite confidence score CS(3) for the third example polar question P=3 may be determined according to Equation 4.

$$CS(1) = \frac{0.05 + (1 - 0.90) + (1 - 0.05)}{3} = 0.36 \qquad \text{Equation 2}$$

$$CS(2) = \frac{0.9 + (1 - 0.05) + (1 - 0.05)}{3} = 0.93 \qquad \text{Equation 3}$$

$$CS(3) = \frac{0.05 + (1 - 0.90) + (1 - 0.05)}{3} = 0.36 \qquad \text{Equation 4}$$

The comparative question/answer sub-system 102 includes a selection engine 122 configured to receive the confidence scores 113 and the plurality of entities 108 associated with the confidence scores 113. The selection engine 122 is configured to identify a particular polar question 125 of the plurality of polar questions 107 based on the confidence scores 113. In some examples, the selection engine 122 is configured to identify the particular polar question 125 by comparing the confidence scores 113 determined for the plurality of polar questions 107 to each other to determine a highest confidence score 123, and determine the polar question associated with the highest confidence score 123 as the particular polar question 125. In these examples, the selection engine 122 is configured to determine the target entity 124 of the particular polar question 125 as the answer to the input query 101.

The comparative question/answer sub-system 102 is configured to output a response 119 to the input query 101 that identifies the target entity 124 of the particular polar question 125 as an answer to the input query 101. In some examples, the comparative question/answer sub-system 102 is configured to output the response 119 to the client device 110 via the network 104.

Figure 2:
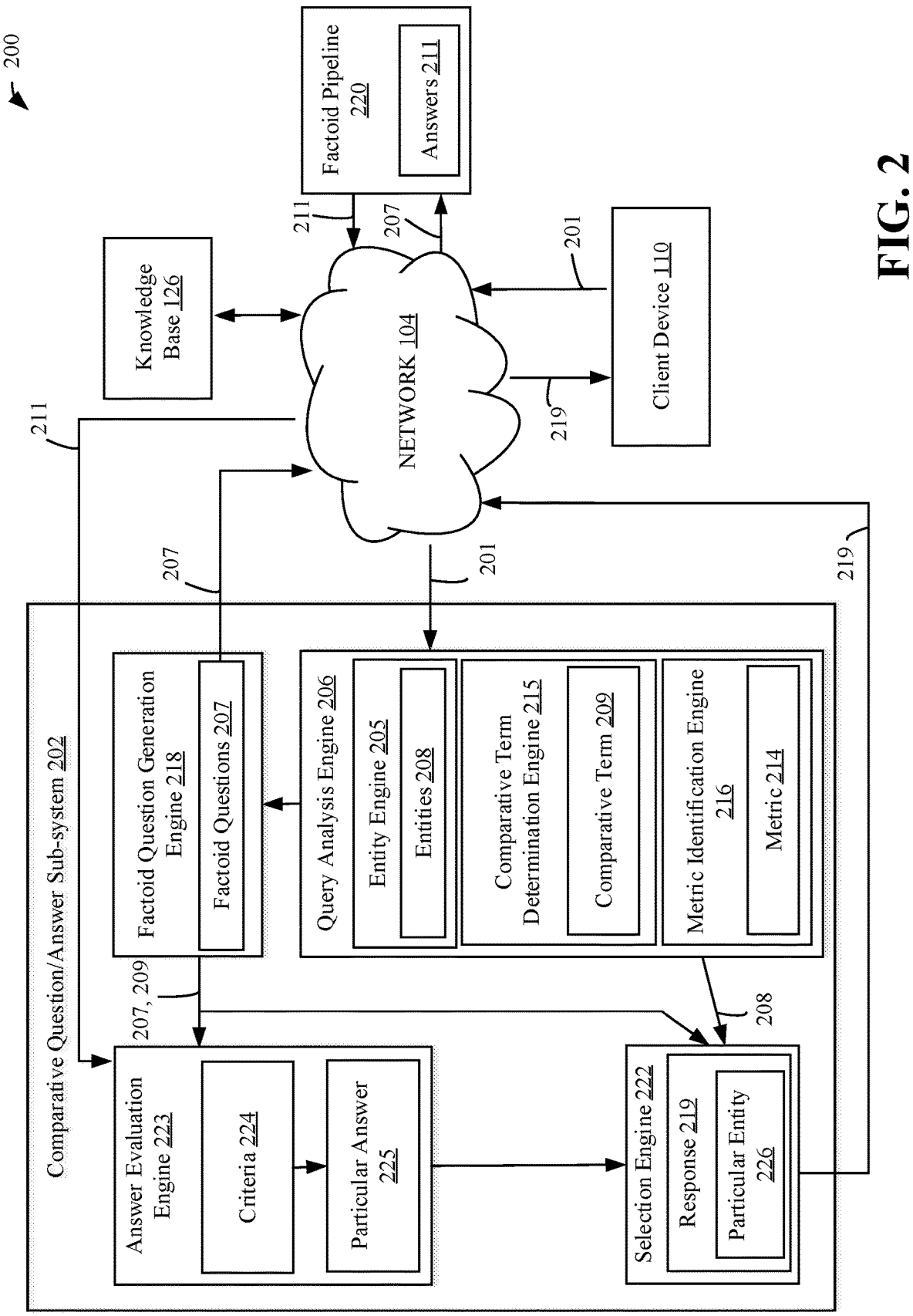
FIG. 2 is a block diagram view of an embodiment of a system according to the present disclosure.

FIG. 2 illustrates an example of another system 200 (e.g., a Q/A system) configured to determine, using a factoid pipeline, an entity as an answer to an input query 201 that includes a comparative question. The system 200 includes a client device 110, a factoid pipeline 220, a comparative question/answer sub-system 202, and a knowledge base 126. The client device 110 and the knowledge base 126 of FIG. 2 may correspond to or be configured to operate as described above with reference to the client device 110 and the knowledge base 126 of FIG. 1.

The client device 110 provides the input query 201 to the comparative question/answer sub-system 202. In the example illustrated in FIG. 2, the client device 110 provides the input query 201 to the comparative question/answer sub-system 202 via the network 104. However, the client device 110 may provide the input query 201 to the comparative question/answer sub-system 202 using a different communication means. The input query 201 may be an input statement that references the plurality of entities 208 or a polar question that references the plurality of entities 208. The input query 201 includes a comparative term 209 regarding a metric 214 associated with the plurality of entities 208. The comparative term 209 may correspond to a superlative or comparative adjective. To illustrate, the input query 201 may correspond to the question "Who threw the most touchdowns with the Browns, Johnny Manziel, Colt McCoy, or Brandon Weeden?". In this example, the plurality of entities 208 correspond to Johnny Manziel, Colt McCoy, and Brandon Weeden, the metric 214 corresponds to a number of touchdown passes thrown while playing for the Cleveland Browns, and the comparative term 209 is "most".

The comparative question/answer sub-system 202 includes a query analysis engine 206 configured to receive the input query 201. The query analysis engine 206 includes an entity engine 205 configured to process the input query 201 to determine the plurality of entities 208, a comparative term determination engine 215 configured to determine the comparative term 209, and a metric identification engine 216 configured to determine the metric 214. The query analysis engine 206 may determine the plurality of entities 208, the comparative term 209, and the metric 214 as described above with reference to the query analysis engine 106 of FIG. 1 and the plurality of entities 108, the comparative term 109, and the metric 114 of FIG. 1.

The comparative question/answer sub-system 202 includes a factoid question generation engine 218 configured to generate a plurality of factoid questions 207. Each of the plurality of factoid questions 207 seeks a factual answer regarding the metric 214 and a respective entity of the plurality of entities 208. To illustrate using the above example input query 201 of "Who threw the most touchdowns with the Browns, Johnny Manziel, Colt McCoy, or Brandon Weeden?", the polar question generation engine 218 may generate a first factoid question "How many touchdowns did Johnny Manziel throw for with the Cleveland Browns?", a second factoid question "How many touchdowns did Colt McCoy throw for with the Cleveland Browns?", and a third factoid question "How many touchdowns did Brandon Weeden throw for with the Cleveland Browns?".

The factoid questions 207 are provided to a factoid pipeline 220 configured to determine one or more answers 211 for each of the factoid questions 207. The factoid pipeline 220 is configured to query a corpus of documents in the knowledge base 126 based on the factoid questions 207 to determine the answers 211. In some examples, the factoid pipeline 220 includes a question analysis engine, a document or passage retrieval engine, and an answer extraction engine. The question analysis engine processes each of the factoid questions 207, analyzes the question type, and generates search queries (e.g., a set of keywords for retrieval) based on the factoid questions 207. Depending on the retrieval and answer extraction strategies, some example question analysis engines also perform syntactic and semantic analysis of the factoid questions 207, such as dependency parsing and semantic role labeling. The document or passage retrieval engine takes the search queries (e.g., keywords) produced by the question analysis engine, and uses some search engine to retrieve one or more documents or passages from the corpus based on the search queries. Two of the most popular search engines used by many question-answer systems are Indri (Metzler and Croft 2004) and Lucene 1. The answer extraction engine determines the answers 211 using the top N relevant retrieved documents or passages from the retrieval engine. Usually, the answer extraction engine produces a list of answer candidates and ranks them according to some scoring functions. However, in other examples, the factoid pipeline 220 uses one or more different techniques to determine the answers 211.

To illustrate using the above example first, second, and third factoid questions 207, the factoid pipeline 220 may determine a first answer of 7 for the first factoid question, a second answer of 21 for the second factoid question, and a third answer of 23 for the third factoid question.

The comparative question/answer sub-system 202 includes an answer evaluation engine 223 configured to identify a particular answer 225 that satisfies a criteria 224 based on the comparative term 209. In some examples, the answer evaluation engine 223 is configured to determine the particular answer 225 by comparing the answers 211 to each other according to the criteria 224. The answer evaluation engine 223 is configured to receive the comparative term 209 (e.g., from the query analysis engine 206 or from the factoid question generation engine 218) and determine the criteria 224 based on the comparative term 209. For example, when the comparative term 209 corresponds to "most" and the answers 211 correspond to quantities, the answer evaluation engine 223 may determine the criteria 224 to be a largest value. In this example, the answer evaluation engine 223 compares the answers 211 to each other to determine the particular answer 225 that has the largest value. To illustrate using the above example comparative term 209 "most" and the above example answers 211 (7, 21, and 23), the answer evaluation engine 223 is configured to compare the values 7, 21, and 23 and determine the answer 23 as the particular answer 225 based on the answer 23 having the largest value.

The comparative question/answer sub-system 202 includes a selection engine 222 configured to determine a particular entity 226 of the plurality of entities 208 that corresponds to the particular answer 225. For example, the factoid question generation engine 218 may generate a mapping between the factoid questions 207 and corresponding entities of the plurality of entities 208, and the factoid pipeline 220 may provide the comparative question/answer sub-system 202 a mapping between each of the answers 211 and a corresponding factoid question. The selection engine 222 may use the mappings between the factoid questions 207 and corresponding entities and the mappings between the factoid questions 207 and the answers 211 to determine which entity of the plurality of entities 208 corresponds to the particular answer 225.

The comparative question/answer sub-system 202 is configured to output a response 219 to the input query 201 that identifies the particular entity 226 as an answer to the input query 201. In some examples, the comparative question/ answer sub-system 202 is configured to output the response 219 to the client device 110 via the network 104.

Figure 3:
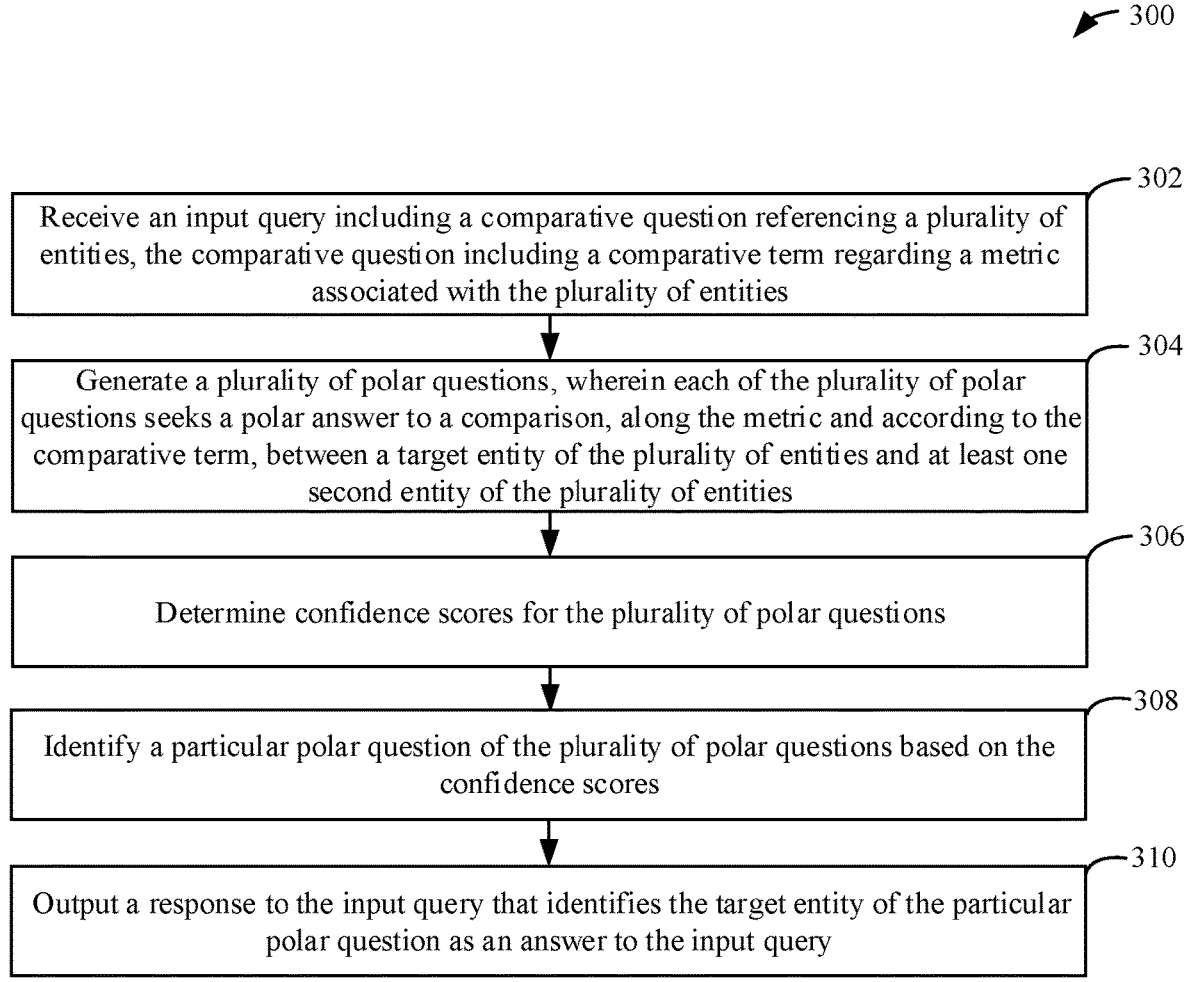
FIG. 3 is a flowchart showing an embodiment of a computer-implemented method capable of being performed, at least in part, by the system of FIG. 1.

FIG. 3 is a flowchart of a computer-implemented method 300 to determine an answer to an input query that includes a comparative question. The computer-implemented method 300 may be performed by one or more components of the system 100 of FIG. 1.

The computer-implemented method 300 includes receiving, at 302, an input query including a comparative question referencing a plurality of entities. The comparative question includes a comparative term regarding a metric associated with the plurality of entities. The input query may correspond to the input query 101 described above with reference to FIG. 1, and the input query may be received by the comparative question/answer sub-system 102 of FIG. 1 from the client device 110 of FIG. 1 via the network 104 of FIG. 1.

The computer-implemented method 300 further includes generating, at 304, a plurality of polar questions. Each of the plurality of polar questions seeks a polar answer to a comparison, along the metric and according to the comparative term, between a target entity of the plurality of entities and at least one second entity of the plurality of entities. For example, the plurality of polar questions may correspond to the plurality of polar questions 107 of FIG. 1, and may be determined by the query analysis engine 106 as described above with reference to FIG. 1.

The computer-implemented method 300 further includes determining, at 306, confidence scores for each of the plurality of polar questions. The confidence scores may correspond to and may be determined as described above with reference to the confidence scores 113 of FIG. 1. In some examples, determining the confidence scores includes receiving an individual confidence score for each of the plurality of polar questions, and determining a composite confidence score for each of the plurality of polar questions based on the individual confidence scores. The individual confidence scores may correspond to and may be determined (e.g., by the SCE 120) as described above with reference to the individual confidence scores 111 of FIG. 1. In some examples, the composite confidence score for each of the plurality of polar questions is determined by determining a difference value for each of the individual confidence scores, determining a sum of the individual confidence score of the polar question and the difference values for the other questions of the plurality of polar questions, and dividing the sum of the individual confidence score of the polar question and the difference values for the other questions by a number of the plurality of polar questions. For example, the individual confidence scores may be determined according to the above Equation 1.

The computer-implemented method 300 further includes identifying, at 308, a particular polar question of the plurality of polar questions based on the confidence scores. For example, the selection engine 122 of FIG. 1 may receive the confidence scores 113 and identify the particular polar question based on the confidence scores 113 as described above with reference to FIG. 1. In some examples, the particular polar question is identified based on the composite confidence score of the particular polar question being greater than the composite confidence scores of the other polar questions as described above with reference to FIG. 1.

The computer-implemented method 300 further includes outputting, at 310, a response to the input query that identifies the target entity of the particular polar question as an answer to the input query.

Figure 4:
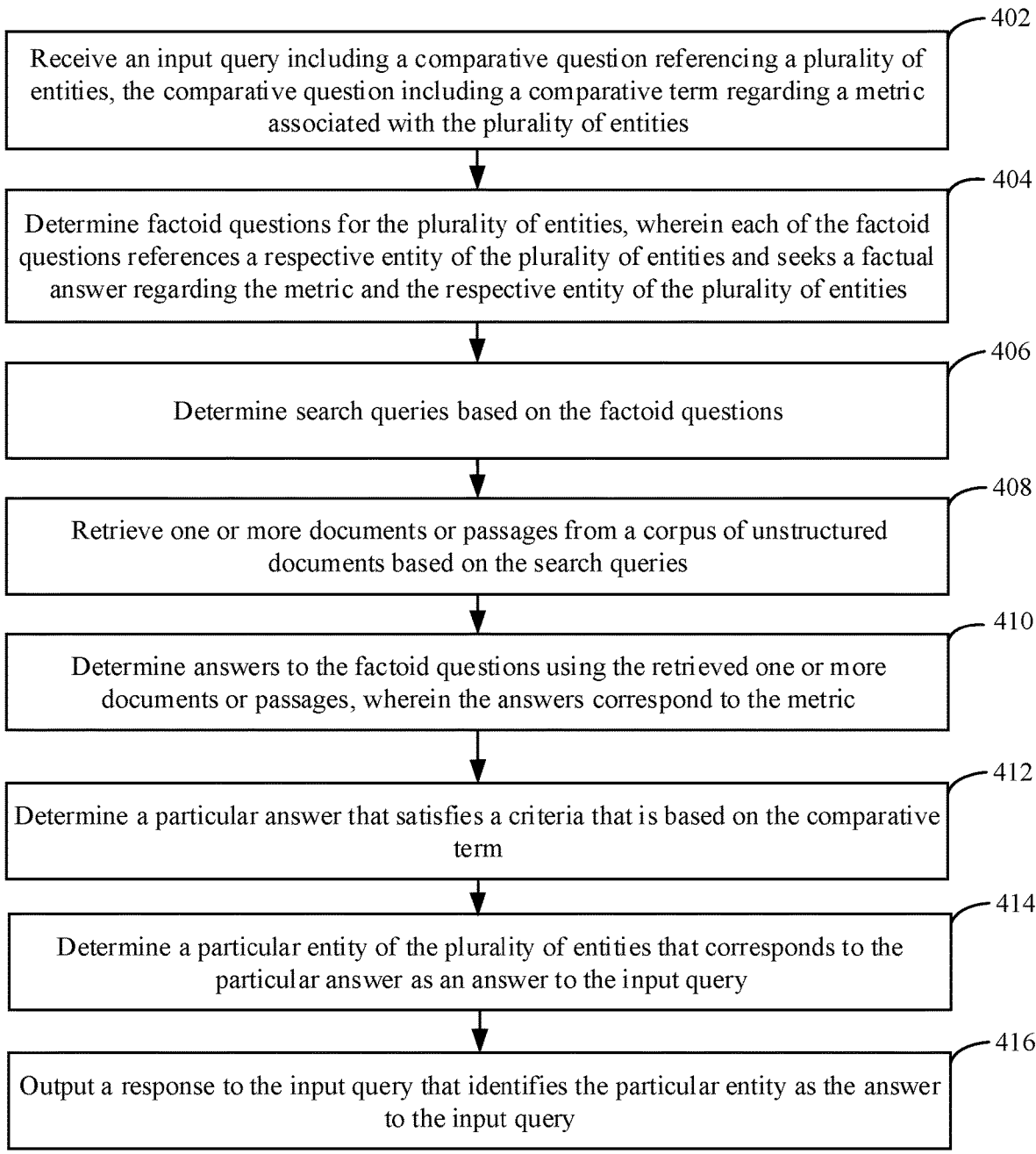
FIG. 4 is a flowchart showing an embodiment of a computer-implemented method capable of being performed, at least in part, by the system of FIG. 2.

FIG. 4 is a flowchart of a computer-implemented method 400 to determine an answer to an input query that includes a comparative question. The computer-implemented method 400 may be performed by one or more components of the system 200 of FIG. 2.

The computer-implemented method 400 includes receiving, at 402, an input query including a comparative question referencing a plurality of entities. The comparative question includes a comparative term regarding a metric associated with the plurality of entities. The input query may correspond to the input query 201 described above with reference to FIG. 2, and the input query may be received by the comparative question/answer sub-system 202 of FIG. 2 from the client device 110 of FIG. 2 via the network 104 of FIG. 2.

The computer-implemented method 400 further includes determining, at 404, factoid questions for the plurality of entities. Each of the factoid questions includes a respective entity of the plurality of entities and seeks a factual answer regarding the metric and a respective entity of the plurality of entities. The factoid questions may correspond to the factoid questions 207 described above with reference to FIG. 2, and may be determined by the factoid question generation engine 218 as described above with reference to FIG. 2.

The computer-implemented method 400 further includes determining, at 406, search queries based on the factoid questions. The search queries may be determined by the factoid pipeline 220 of FIG. 2 as described above with reference to FIG. 2.

The computer-implemented method 400 further includes retrieving, at 408, one or more documents or passages from a corpus of unstructured documents based on the search queries. The one or more documents or passages may be retrieved by the factoid pipeline 220 of FIG. 2 as described above with reference to FIG. 2.

The computer-implemented method 400 further includes determining, at 410, answers to the factoid questions using the retrieved one or more documents or passages. The answers may correspond to the answers 211 described above with reference to FIG. 2, and may be determined by the factoid pipeline 220 as described above with reference to FIG. 2.

The computer-implemented method 400 further includes determining, at 412, a particular answer that satisfies a criteria that is based on the comparative term. For example, the particular answer may correspond to the particular answer 225 of FIG. 2, and may be determined by the answer evaluation engine 223 of FIG. 2 as described above with reference to FIG. 2.

The computer-implemented method 400 further includes determining, at 414, a particular entity of the plurality of entities that corresponds to the particular answer as an answer to the input query. For example, the particular entity may correspond to the particular entity 226 of FIG. 2, and may be determined by the selection engine 222 as described above with reference to FIG. 2.

The computer-implemented method 400 further includes outputting, at 416, a response to the input query that identifies the particular entity as an answer to the input query.

Figure 5:
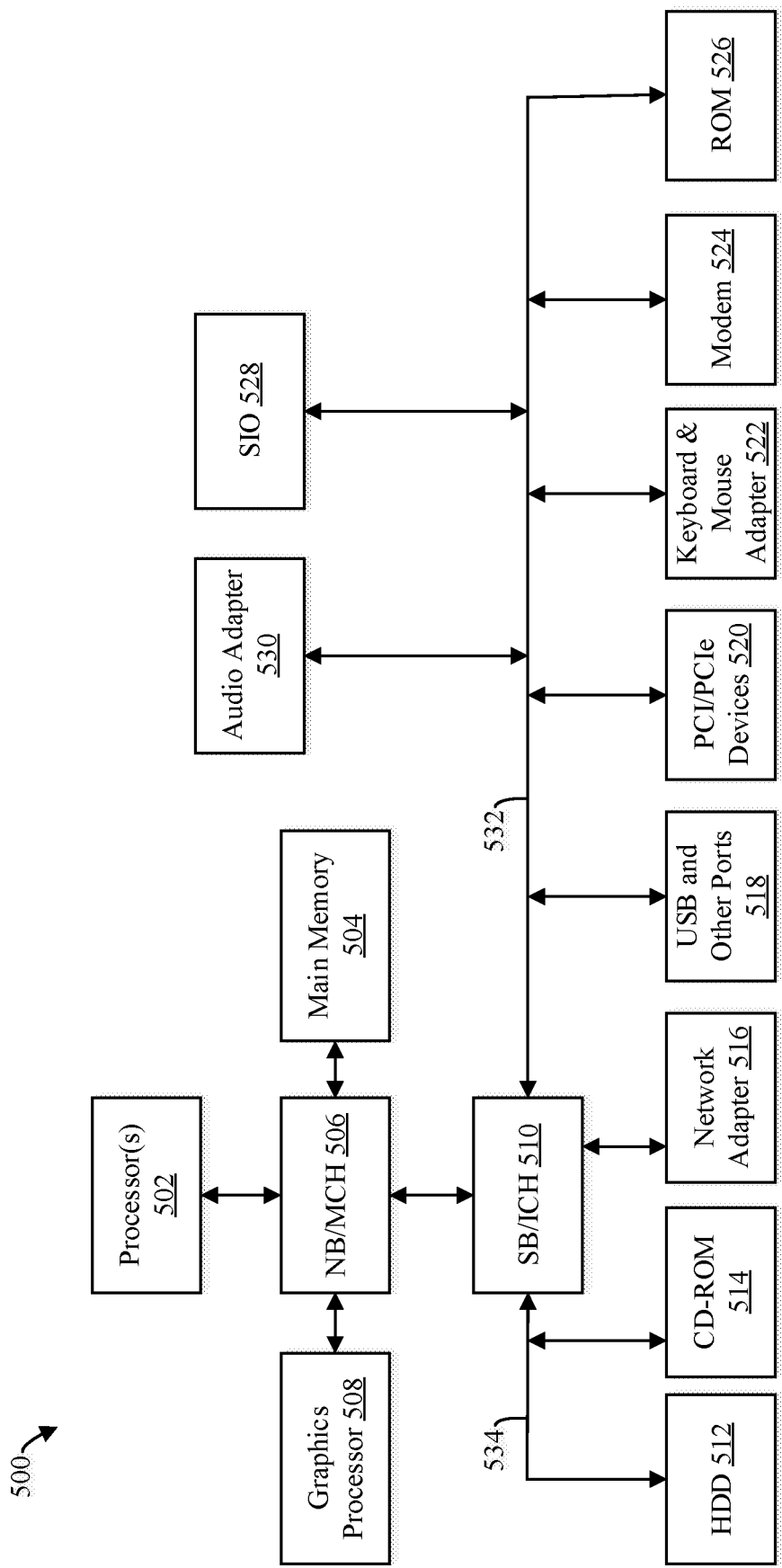
FIG. 5 shows an illustrative block diagram of an example data processing system that can be applied to implement embodiments of the present disclosure.

FIG. 5 is a block diagram of an example data processing system in which aspects of the illustrative embodiments may be implemented. Data processing system 500 is an example of a computer that can be applied to implement one or more components of the system 100 of FIG. 1 (e.g., the comparative question/answer sub-system 102 of FIG. 1) or the system 200 of FIG. 2 (e.g., the comparative question/answer sub-system 202 of FIG. 2) and in which computer usable code or instructions implementing the processes for illustrative embodiments of the present disclosure may be located. In one illustrative embodiment, FIG. 5 represents a computing device that implements the one or more components of the system 100 of FIG. 1 (e.g., the comparative question/answer sub-system 102 of FIG. 1) or the system 200 of FIG. 2 (e.g., the comparative question/answer sub-system 202 of FIG. 2) augmented to include the additional mechanisms of the illustrative embodiments described hereafter.

In the depicted example, data processing system 500 employs a hub architecture including north bridge and memory controller hub (NB/MCH) 506 and south bridge and input/output (I/O) controller hub (SB/ICH) 510. Processor(s) 502, main memory 504, and graphics processor 508 are connected to NB/MCH 506. Graphics processor 508 may be connected to NB/MCH 506 through an accelerated graphics port (AGP).

In the depicted example, local area network (LAN) adapter 516 connects to SB/ICH 510. Audio adapter 530, keyboard and mouse adapter 522, modem 524, read only memory (ROM) 526, hard disc drive (HDD) 512, compact disc ROM (CD-ROM) drive 514, universal serial bus (USB) ports and other communication ports 518, and peripheral component interconnect (PCI) or PCI Express (PCIe) devices 520 connect to SB/ICH 510 through bus 532 and bus 534. PCI/PCIe devices may include, for example, Ethernet adapters, add-in cards, and personal computer (PC) cards for notebook computers. PCI uses a card bus controller, while PCIe does not. ROM 526 may be, for example, a flash basic input/output system (BIOS).

HDD 512 and CD-ROM drive 514 connect to SB/ICH 510 through bus 534. HDD 512 and CD-ROM drive 514 may use, for example, an integrated drive electronics (IDE) or serial advanced technology attachment (SATA) interface. Super I/O (SIO) device 528 may be connected to SB/ICH 510.

An operating system runs on processor(s) 502. The operating system coordinates and provides control of various components within the data processing system 500 in FIG. 5. In some embodiments, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 500.

In some embodiments, data processing system 500 may be, for example, an IBM® eServer™ System p® computer system, running the Advanced Interactive Executive (AIX®) operating system or the LINUX® operating system. Data processing system 500 may be a symmetric multiprocessor (SMP) system including a plurality of processors 502. Alternatively, a single processor system may be employed.

Instructions for the operating system, the object-oriented programming system, and applications or programs are located on storage devices, such as HDD 512, and may be loaded into main memory 504 for execution by processor(s) 502. The processes for illustrative embodiments of the present disclosure may be performed by processor(s) 502 using computer usable program code, which may be located in a memory such as, for example, main memory 504, ROM 526, or in one or more peripheral devices 512 and 514, for example.

A bus system, such as bus 532 or bus 534 as shown in FIG. 5, may include one or more buses. The bus system may be implemented using any type of communication fabric or architecture that provides for a transfer of data between different components or devices attached to the fabric or architecture. A communication unit, such as modem 524 or network adapter 516 of FIG. 5, may include one or more devices used to transmit and receive data. A memory may be, for example, main memory 504, ROM 526, or a cache such as found in NB/MCH 506 in FIG. 5.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a ROM, an erasable programmable read only memory (EPROM) or Flash memory, a static RAM (SRAM), a portable CD-ROM, a digital video disc (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or eternal storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving an input query including a comparative question referencing a plurality of entities;
determining the plurality of entities in the comparative question;
determining a comparative term in the comparative question;
determining a metric in the comparative question;
generating a plurality of polar questions comprising a polarity question for each entity in the comparative question, each of the polar questions seeks a polar answer to a comparison wherein each of the polar questions applies a question structure comprising a target entity of the plurality of entities, at least one of the comparative term and the metric in the comparative question, and at least one second entity of the plurality of entities;
determining confidence scores for the plurality of polar questions by determining individual confidence scores for the plurality of polar questions and determining composite confidence scores for the plurality of polar questions based on the individual confidence scores, the composite confidence scores determined by determining a difference value for each of the individual confidence scores, and for each of the plurality of polar questions, determining a value equal to the individual confidence score of the polar question plus a sum of the difference values for the other polar questions of the plurality of polar questions; and dividing the value by a number of the plurality of polar questions to determine a composite confidence score of a polar question;
identifying a particular polar question of the plurality of polar questions based on the composite confidence scores; and
outputting a response to the input query that identifies the target entity of the particular polar question as an answer to the input query.

2. The computer-implemented method of claim 1, wherein the particular polar question is identified based on a composite confidence score for the particular polar question being greater than the composite confidence scores of the other polar questions of the plurality of polar questions.

3. The computer-implemented method of claim 2, wherein the difference value for each of the plurality of polar questions corresponds to one minus the individual confidence score for the polar question.

4. The computer-implemented method of claim 1, wherein determining the individual confidence scores comprises:
determining search queries based on the plurality of polar questions;

retrieving one or more documents or passages from a corpus of unstructured documents based on the search queries;

determining polar answers and associated confidence estimates for the plurality of polar questions using the retrieved one or more documents or passages;

determining the confidence estimates for first polar questions associated with a positive polar answer as the individual confidence scores for the first polar questions; and determining the individual confidence scores for second polar questions associated with a negative polar answer by determining a difference value for each of the confidence estimates determined for the second polar questions.

5. The computer-implemented method of claim 4, wherein the difference values correspond to one minus the confidence estimates.

6. The computer-implemented method of claim 1, wherein the comparative term corresponds to a superlative or comparative adjective.

7. A computer program product for determining an answer to a comparative question, the computer program product comprising a computer readable storage medium having program instructions embodied therewith, the program instructions executable by a processor to cause the processor to:

receive an input query including a comparative question referencing a plurality of entities;

determine a comparative term in the comparative question;

determine a metric in the comparative question;

generate a plurality of polar questions comprising a polarity question for each entity in the comparative question, each of the polar questions seeks a polar answer to a comparison, wherein each of the polar questions applies a question structure comprising a target entity of the plurality of entities, at least one of the comparative term and the metric in the comparative question, and at least one second entity of the plurality of entities;

determine confidence scores for the plurality of polar questions by determining individual confidence scores for the plurality of polar questions and determining composite confidence scores for the plurality of polar questions based on the individual confidence scores, the composite confidence scores determined by determining a difference value for each of the individual confidence scores, and for each of the plurality of polar questions, determining a value equal to the individual confidence score of the polar question plus a sum of the difference values for the other polar questions of the plurality of polar questions; and dividing the value by a number of the plurality of polar questions to determine a composite confidence score of a polar question;

identify a particular polar question of the plurality of polar questions based on the confidence scores; and output a response to the input query that identifies the target entity of the particular polar question as an answer to the input query.

8. The computer program product of claim 7, wherein the program instructions executable by the processor to cause the processor to identify the particular polar question are executable by the processor to cause the processor to identify the particular polar question based on the composite confidence score of the particular polar question being greater than the composite confidence scores of the other polar questions of the plurality of polar questions.

9. The computer program product of claim 7, wherein the difference value for each of the plurality of polar questions corresponds to one minus the individual confidence score for the polar question.

10. The computer program product of claim 7, wherein the program instructions executable by the processor to cause the processor to determine the individual confidence scores are executable by the processor to cause the processor to:

determine search queries based on the plurality of polar questions;

retrieve one or more documents or passages from a corpus of unstructured documents based on the search queries;

determine polar answers and associated confidence estimates for the plurality of polar questions using the retrieved one or more documents or passages;

determine the confidence estimates for first polar questions associated with a positive polar answer as the individual confidence scores for the first polar questions; and determine the individual confidence scores for second polar questions associated with a negative polar answer by determining a difference value for each of the confidence estimates determined for the second polar questions.

11. The computer program product of claim 10, wherein the difference values correspond to one minus the confidence estimates.

12. The computer program product of claim 7, wherein the comparative term corresponds to a superlative or comparative adjective.

* * * * *